United States Patent [19]

St. Peter

[11] Patent Number: 5,469,633
[45] Date of Patent: Nov. 28, 1995

[54] PLUMB BOB

[76] Inventor: Lawrence A. St. Peter, 521 Division St., Hubbell, Mich. 49934

[21] Appl. No.: 231,257

[22] Filed: Apr. 22, 1994

[51] Int. Cl.$^6$ .................................................. G01C 15/10
[52] U.S. Cl. ............................................... 33/394; 33/392
[58] Field of Search ............................ 33/394, 393, 392

[56] References Cited

U.S. PATENT DOCUMENTS

| | | |
|---|---|---|
| 1,090,015 | 3/1914 | Birchbauer ............................... 33/394 |
| 1,349,565 | 8/1920 | Ewing et al. ............................. 33/394 |
| 1,357,270 | 11/1920 | Bush ......................................... 33/394 |
| 2,492,609 | 12/1949 | Worden . | 
| 2,714,766 | 8/1955 | Saxon et al. . |
| 3,027,977 | 4/1962 | Knaus . |
| 3,064,356 | 11/1962 | Kruse . |
| 3,442,025 | 5/1969 | Mathiesen . |
| 3,478,438 | 11/1969 | Lazar . |
| 4,459,761 | 7/1984 | Bosco ....................................... 33/414 |
| 4,489,500 | 12/1984 | Valat ........................................ 33/394 |

*Primary Examiner*—Christopher W. Fulton
*Attorney, Agent, or Firm*—Michael, Best & Friedrich

[57] ABSTRACT

A plumb bob including an elongated body having a longitudinal axis and opposite ends on the longitudinal axis; a bore extending generally along the longitudinal axis; an elongated cord extending through one of the opposite ends into the bore; storage apparatus mounted on the body and connected to the cord and having a length of cord wound thereon, the storage apparatus including an overriding mechanism selectively operable in response to a force exerted on the elongated body in the direction of the longitudinal axis to allow the cord accumulated thereon to be played-out and upon release of the force to accumulate the cord thereon, and a locking mechanism positioned at the one end of the body adjacent the cord and selectively operable between a first position in engagement with the cord and a second position released from the cord.

4 Claims, 1 Drawing Sheet

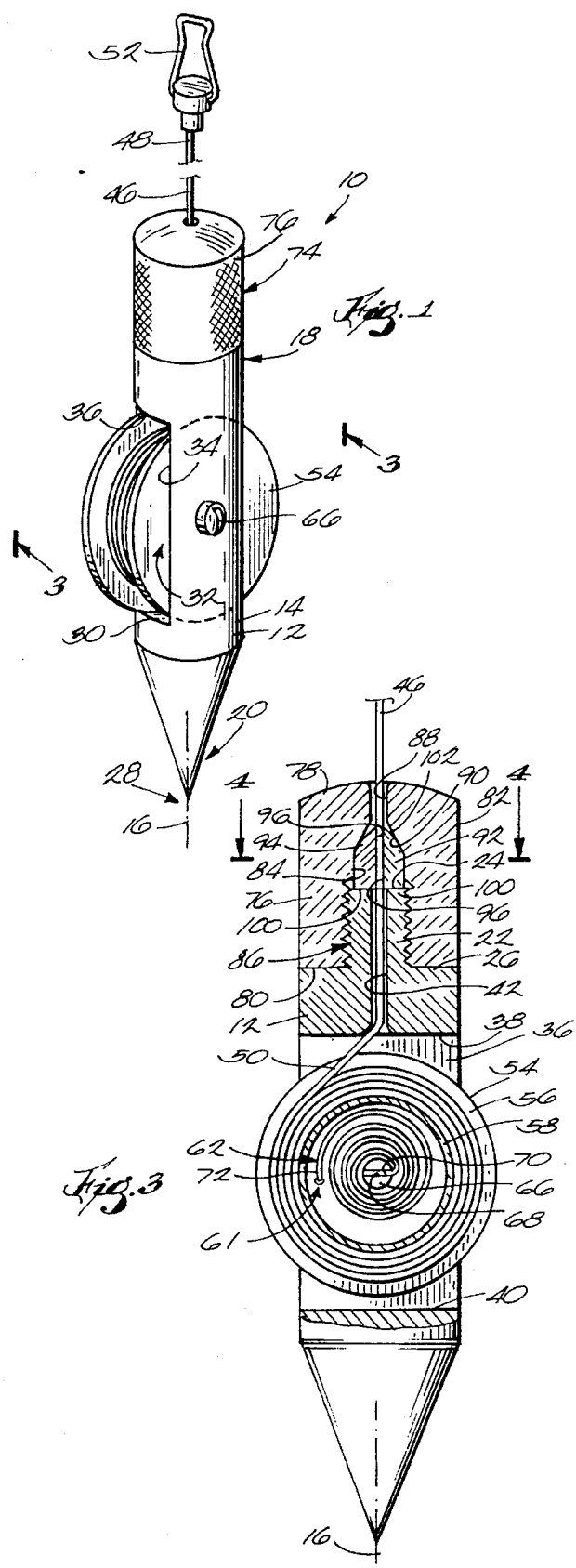
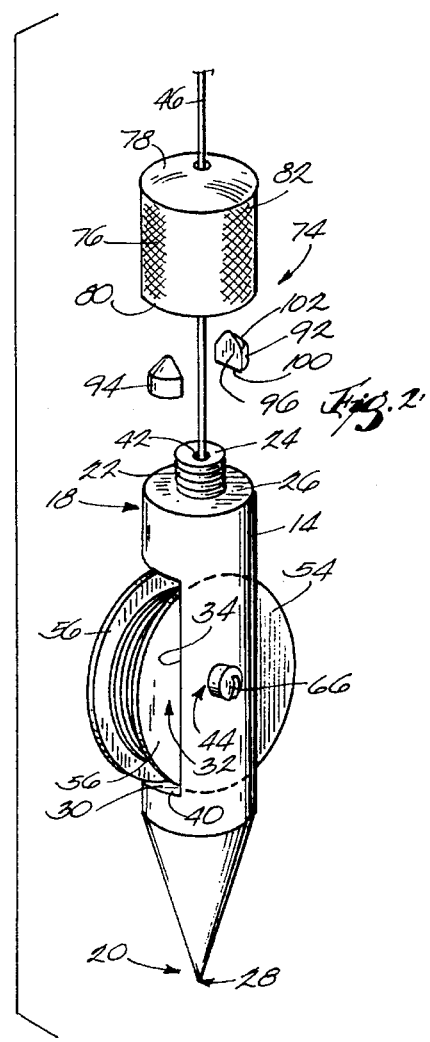
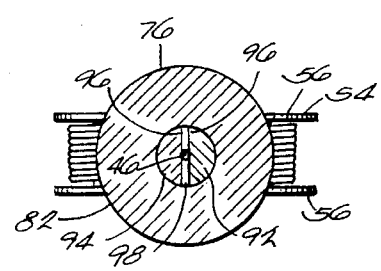

PLUMB BOB

BACKGROUND OF THE INVENTION

1. Field of the Invention

The invention relates generally to plumb bobs for use in construction work and the like.

2. Discussion of Related Art

Plumb bobs are used by surveyors, engineers and artisans in construction work for establishing straight vertical lines. A plumb bob includes a body and a cord. The cord has a free end and an opposite end connected to the body. The cord is stored on a take-up spool. To use the plumb bob, the cord is unwound from the spool to an extended position and is suspended from the free end, such that the body hangs from the opposite end of the cord. Thus, the cord defines a straight vertical line between the free end and the opposite end connected to the body. In one arrangement disclosed in U.S. Pat. Nos. 2,492,609, 3,442,025, 3,478,438 and 4,459,761, the spool is supported separate from the body, and the cord at the free end is wound around the spool for storage and at the opposite end is connected to the body. In another arrangement disclosed in U.S. Pat. Nos. 2,714,766, 3,027,977 and 3,064,356, the spool is mounted on the body, such that the cord at the end opposite the free end is wound around the spool and is thereby connected to the body.

One type of plumb bob, commonly referred to as a retractable or automatic plumb bob, includes a spring such as a coil spring which exerts a biasing force on the spool and thereby causes the spool to rotate and retract the cord from the extended position to the storage position. A braking or locking mechanism is selectively operable to prevent the cord from being retracted onto the spool. Typically, the locking mechanism operates directly against the spool to prevent the spool from rotating under the biasing force of the coil spring. In one arrangement disclosed in U.S. Pat. No. 3,027,977, the locking mechanism operates against the cord to prevent the cord from being retracted onto the spool. The locking mechanism disclosed in U.S. Pat. No. 3,027,977 includes a pin perpendicular to the cord and having a pair of washers mounted thereon. The cord extends through a space defined between the washers, and the pin is biased toward a clamping position wherein the cord is clamped between the washers and is thereby prevented from moving relative to the spool. When the pin is moved from the clamping position by the user pushing a plunger, the cord is permitted to move for winding or unwinding relative to the spool.

SUMMARY OF THE INVENTION

The invention provides a plumb bob including a locking mechanism which is selectively operable for engaging and releasing the cord by twisting the locking mechanism relative to the body.

More particularly, the invention provides a plumb bob including an elongated body and a bore extending generally along the longitudinal axis of the body. A cord extends into the bore and is connected to storage means mounted on the body. The storage means includes an overriding mechanism which is selectively operable in response to a force exerted on the body in the direction of the longitudinal axis to allow the cord to be played-out and upon release of the force to accumulate the cord thereon. The plumb bob also includes a locking mechanism which is positioned at one end of the body adjacent the cord and is selectively operable between a first position in engagement with the cord and a second position released from the cord.

Other features and advantages of the invention will become apparent to those skilled in the art upon review of the following detailed description, claims and drawings.

BRIEF DISCUSSION OF THE DRAWINGS

FIG. 1 is a perspective view of a plumb bob embodying the invention.

FIG. 2 is an exploded view of the plumb bob shown in FIG. 1.

FIG. 3 is a cross sectional view taken generally along line 3—3 in FIG. 1.

FIG. 4 is a cross sectional view taken generally along line 4—4 in FIG. 3.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in the figures is a plumb bob 10 embodying the invention. The plumb bob 10 includes a body 12. Although the body 12 can be shaped differently, in the illustrated embodiment the body 12 is an elongated member having, an outer surface 14, a longitudinal axis 16, and opposed upper and lower end portions 18 and 20 on the longitudinal axis 16. The upper end portion 18 includes a threaded stub 22 having an upper end surface 24 perpendicular to the longitudinal axis 16. Opposite from the upper end surface 24, the stub 22 terminates at a shoulder 26 perpendicular to the longitudinal axis 16. The lower end portion 20 is cone-shaped and includes a lowermost apex 28. The body 12 also includes, intermediate the upper and lower end portions 18 and 20, a continuous inner wall 30. The inner wall 30 extends between opposed portions of the outer surface 14 and thereby defines a central cavity 32. The inner wall 30 includes a pair of opposed side portions 34 and 36 parallel to the longitudinal axis 16. The inner wall 30 also includes a pair of opposed upper and lower end portions 38 and 40 connecting the side portions 34 and 36. A bore 42 extends along the longitudinal axis 16 between the upper end portion 38 of the inner wall 30 and the end surface 24 of the threaded stub 22. An aperture 44 extends perpendicular to the longitudinal axis 16 between the outer surface 14 and the side portion 34 of the inner wall 30. A cavity (not shown) in the opposite side portion 36 of the inner wall 30 is aligned with the aperture 44.

The plumb bob 10 also includes a length of an elongated, flexible cord 46. The cord 46 includes an outer end portion 48 and an inner end portion 50 opposite the outer end portion 48. The cord 46 extends through the bore 42 and into the cavity 32. An eye 52 is connected to the outer end portion 48 of the cord 46 for hanging the cord from a reference point such as a nail.

The plumb bob 10 also includes storage means for storing the cord 46. Although the storage means could be of any suitable construction, in the illustrated embodiment the storage means includes a spool 54. The spool 54 includes a pair of spaced, circular side walls 56, a cylindrical outer wall 58 extending between the side walls 56, and a longitudinal axis perpendicular to the longitudinal axis 16 of the body 12. The side walls 56 extend radially outwardly beyond the outer wall 58, such that a continuous channel is defined therebetween for receiving multiple windings of the cord 46 around the outer wall 58. The spool 54 also includes means for connecting to an overriding mechanism (described below), which in the illustrated embodiment is an aperture 61 in one side wall 56. The inner end portion 50 of the cord 46 is connected to the spool 54 in a conventional manner. In a storage position, substantially all of the cord 46 is wound in multiple turns around the spool 54 for storing the cord 46 thereon, except that the outer end portion 64 extends through the bore 42. The cord 46 can be unwound from the spool 54 to an extended position, as described below. The spool 54 is mounted on a pin 66 for rotation in opposite directions about the axis 60. The pin 66 is journaled through the aperture 44, extends through the cavity 32, and is received in the cavity aligned with the aperture 44 in the opposite side portion 36. A cross bore 68 extends through the pin 66 perpendicular to the longitudinal axis 16.

The storage means also includes an overriding mechanism 62 connected to the spool 54. Although any suitable overriding mechanism can be used, in the illustrated embodiment of the invention, the overriding mechanism 62 is a coil spring located inside the spool 54. The coil spring 62 includes an inner end portion 70 inserted through the cross bore 68 in the pin 66 and an outer end portion 72 connected to the spool 54 by insertion into the aperture 61 in one side wall 56 of the spool 54. The coil spring 62 biases the spool 54 toward a retracted position, such that when a pulling force is exerted on the body 12 or cord 46 for playing-out or unwinding the cord 46, the coil spring 62 is operable in response to the force to permit the spool 54 to rotate in a direction allowing the cord 46 accumulated on the spool 54 to be unwound therefrom. Upon release of the pulling force, the coil spring 62 is operable to cause the spool 54 to rotate in an opposite direction and accumulate the cord 46 thereon. Thus, the overriding mechanism 62 is operable in response to a force exerted on the body 12 or the cord 46 in the direction of the longitudinal axis 16 to allow the cord 46 accumulated on the spool 54 to be played-out, and upon release of the force to accumulate the cord 46 on the spool 54.

The plumb bob 10 also includes a locking mechanism 74 which is positioned at the upper end portion 18 of the body 12 adjacent the cord 46. The locking mechanism 74 includes an internally threaded locking nut 76. The locking nut 76 includes opposed upper and lower end surfaces 78 and 80. The lower end surface 80 is adjacent the shoulder 26 on the body 12. The locking nut 76 also includes a continuous outer surface 82 between the upper and lower end surfaces 78 and 80. The outer surface 82 is textured or knurled to permit gripping the locking nut 76. The locking nut 76 has a longitudinal axis continuous with the longitudinal axis 16 of the body 12. The locking nut 76 has therein a bore 84 extending generally along the longitudinal axis 16 between the upper and lower end surfaces 78 and 80. The bore 84 includes an internally threaded portion 86 adjacent the lower end surface 80 for engaging the threaded stub 22 on the body 12. The locking nut 76 can be twisted in a clockwise direction relative to the stud 22 to tighten or move the locking nut 76 to a first position, and can be twisted in an opposite counterclockwise direction to release or move the locking nut 76 to a second position. The bore 84 also includes a smooth, narrow portion 88 adjacent the upper end surface 78. The bore 84 also includes a cam portion 90 extending between the internally threaded portion 86 and the narrow portion 88. The cam portion 90 is curved and tapers inwardly from the internally threaded portion 86 to the narrow portion 88. When the locking nut 76 is positioned on the threaded stub 22, the cord 46 extends out of the bore 42 and upwardly through the cam portion 90 and the narrow portion 88 of the bore 84.

The locking mechanism 74 also includes a pair of loose cams 92 and 94 disposed on opposite sides of the cord 46 in the cam portion 90 of the bore 84. The cams 92 are identical, and only cam 92 will be described in further detail. The cam 92 includes a flat inner surface 96 parallel to the longitudinal axis 16. The inner surface 96 of the cam 92 is opposed and spaced slightly from the inner surface 96 of the cam 94. A space 98 is defined between the opposed inner surfaces 96 of the respective cams 92 and 94. The cord 46 extends through the space 98 between the cams 92 and 94. The cam 92 also includes a flat lower end surface 100 perpendicular to the longitudinal axis 16 and the inner surface 96. The upper end surface 24 of the threaded stub 22 abuts the lower end surfaces 100 of the cams 92 and 94 and thereby urges the cams 92 and 94 upwardly. The cam 92 also has a curved outer surface 102 opposite the inner surface 96. The tapered cam portion 90 of the bore 84 abuts the outer surfaces 102 of the cams 92 and 94 and thereby urges the cams 92 and 94 inwardly. The outer surface 102 is curved and tapers inwardly from the lower end surface 100 to the inner surface 96. The degree of taper and curvature of the outer surface 102 is substantially identical to the taper and curvature of the cam portion 90 of the bore 84. The cams 92 and 94 are movable relative to each other between a first position (shown in FIGS. 3 and 4) corresponding to the tightened or first position of the locking nut 76 and wherein the inner surfaces 96 of the cams 92 and 94 engage the cord 46, and a second position (not shown) corresponding to the loosened or second position of the locking nut 76 and wherein the inner surfaces 96 of the cams 92 and 94 do not engage the cord 46. When the locking nut 76 is in the first position, the cams 92 and 94 are urged so far inwardly that the cord 46 extending through the space 98 is engaged or clamped between the inner surfaces 96 of the cams 92 and 94. The cord 46 being thus clamped in the first position cannot be played-out from or accumulated onto the spool 54. The locking nut 76 is twisted relative to the threaded stub 22 to move the locking nut 76 from the first position to the second position, wherein the locking nut 76 is slightly loosened on the threaded stub 22. When the locking nut 76 is in the second position, the cams 92 and 94 are not urged so far inwardly as in the first position, and the cord 46 is not engaged or clamped between the inner surfaces 96 of the cams 92 and 94. Thus, in the second position, the cord 46 can be played-out from or accumulated onto the spool 54. The locking nut 76 can thus be turned or loosened from the first position wherein the cord 46 is clamped between the inner surfaces 96 of the cams 92 and 94 to the second position wherein the cord 46 is not clamped between the inner surfaces 96 of the cams 92 and 94. Thus, the locking mechanism 74 is selectively operable between a first position (see FIGS. 3 and 4) in engagement with the cord 46 and a second position (not shown) released from the cord 46. When the locking mechanism 74 is in engagement with the cord 46, the cord 46 is prevented from moving relative to the locking mechanism 74, and thus from being played-out from the spool 54 or from accumulating onto the spool 54.

With the cord 46 stored on the spool 54 and the locking nut 76 initially occupying the first position, the cord 46 extending through the space 98 is engaged or clamped between the inner surfaces 96 of the cams 92 and 94 and cannot be played-out from or accumulated onto the spool 54. To use the plumb bob 10, the locking nut 76 is twisted counterclockwise relative to the threaded stub 22 on the body 12 to move the locking nut 76 from the first position to the second position, and the cord 46 is played-out from the spool 54 by pulling the cord 46 outwardly relative to the body 12 with sufficient force to overcome the bias of the coil spring 62. When a desired length of cord 46 is played-out from the spool 54, the locking nut 76 is twisted clockwise relative to the stub 22 to move the locking nut 76 to the first position and clamp the cord 46 between the cams 92 and 94. Then, the eye 52 at the free or outer end portion 48 of the cord 46 is connected to a reference point such as a nail, and the cord 46 is suspended from the eye 52, such that the body 12 is suspended from the inner end portion 104 of the cord 46. Thus, the cord 46 establishes a straight vertical line. After the line is marked in a conventional manner, the locking nut 76 is twisted relative to the stub 22 to move the locking nut 76 to the second position, so that the cord 46 is not clamped between the cams 92 and 94. When the locking nut 76 is moved to the second position, the coil spring 62 causes the spool 54 to rotate and thereby accumulate the cord 46 thereon until the eye 52 at the outer end portion 48 of the cord 46 is drawn against the upper end surface 78 of the locking nut 76. Then, the plumb bob 10 is stored with substantially all of the cord 46 wound around the spool 54.

What is claimed is:

1. A plumb bob comprising, in combination, an elongated body having a longitudinal axis, opposite ends on said longitudinal axis, a bore extending generally along said longitudinal axis, an upper end surface, and a cavity intermediate said opposite ends;

an elongated cord extending through one of said opposite ends into said bore;

a rotatable spool mounted in said cavity for rotation relative to said body, said spool being mounted in said cavity such that said spool is exposed in said cavity and projects outwardly from said body, and said spool being connected to said cord and having a length of said cord wound thereon, and a locking mechanism positioned at said one end of said body adjacent said cord and selectively operable between a first position in engagement with said cord and a second position released from said cord, said locking mechanism including a locking nut which is movable relative to said body between said first and second positions, said locking nut having therein a bore through which said cord extends, said bore of said locking nut terminating in an upper end surface which tapers inwardly and upwardly, said locking mechanism further including a pair of cams disposed in said bore of said locking nut, said cams when so disposed abut said upper end surface of said body, said cams taper inwardly and upwardly and complement said inward and upward taper of said upper end surface of said bore of said locking nut, said cams define therebetween a space through which said cord extends, said cams are movable toward each other in response to movement of said locking nut from said second position to said first position.

2. A plumb bob as set forth in claim 1 wherein said plumb bob further includes an overriding mechanism selectively operable in response to a force exerted on said elongated body in the direction of said longitudinal axis to allow said cord wrapped around said spool to be played-out and upon release of said force to accumulate on said spool.

3. A plumb bob comprising, in combination:

a movable locking nut having two ends, an inner threaded portion adjacent one end, a cam portion in the interior of said locking nut and aligned and in communication with said threaded portion, and a bore adjacent said other end of said locking nut, said bore aligned and in communication with said cam portion, said cam portion is curved and tapers inwardly in the direction of the bore;

an elongated body having an upper portion and a central portion, said upper portion including a threaded stub and a bore therethrough which communicates with said bore of said locking nut, said threaded stub interengages with said threaded portion of said locking nut so that said locking nut is movable relative to said threaded stub between a first position and a second position, said central portion having a rectangular slot therethrough defining a central cavity and having a bore which communicates with the central cavity and which communicates with said bore of said upper portion, said central cavity having a transverse axis;

a spool mounted in said slot for rotation about said transverse axis, said spool having thereon a channel;

an elongated cord having two ends, one end of said cord being fixed to said spool, the other end of said cord being free of said body and said locking nut, the length of said cord therebetween extending through said bore and said cam portion of said locking nut, through said bore of said upper portion of said elongated body, into said central cavity whereby the excess cord is wrapped around said channel of said spool; and a pair of cams, each having a flat inner surface, a flat lower end, a curved outer surface tapering upwardly, said curved outer surface complements the curvature and taper of said cam portion of said locking nut, said cams being disposed in said cam portion so that said lower ends abut said threaded stub of said elongated body, so that said inner surfaces are adjacent, and so that a space is defined between said inner surfaces, so said portion of said cord extending through said cam portion extends through said space, and so that said cams taper inwardly in the direction that said cam portion tapers inwardly, when said locking nut is moved from said first to said second positions, said cam portion urges said inner surfaces of said cams closer together so that said inner surfaces fixedly engage said portion of said cord in said space therebetween.

4. A plumb bob as set forth in claim 3 wherein said plumb bob further includes an overriding mechanism selectively operable in response to a force exerted on said elongated body in the direction of said longitudinal axis to allow said cord wrapped around said channel of said spool to be played-out and upon release of said force to accumulate on said channel.

\* \* \* \* \*